United States Patent
Lawson et al.

(10) Patent No.: US 6,274,680 B1
(45) Date of Patent: Aug. 14, 2001

(54) SULFENYL HALIDE POLYMERIZATION TERMINATORS

(75) Inventors: David F. Lawson, Uniontown; Mark L. Stayer, Suffield; Thomas A. Antkowiak, Rittman, all of OH (US)

(73) Assignee: Bridgestone/Firestone Research, Inc., Akron, OH (US)

( * ) Notice: Subject to any disclaimer, the term of this patent is extended or adjusted under 35 U.S.C. 154(b) by 0 days.

(21) Appl. No.: 09/224,328

(22) Filed: Dec. 31, 1998

(51) Int. Cl.$^7$ .................................................. C08F 8/34
(52) U.S. Cl. ................ 525/341; 525/330.4; 525/332.8; 525/332.9; 525/330.1; 525/330.2; 525/333.5; 525/342; 525/343
(58) Field of Search .................... 525/341, 342, 525/343

(56) References Cited

U.S. PATENT DOCUMENTS

| | | | |
|---|---|---|---|
| 3,370,033 | 2/1968 | Witte et al. | 260/33.6 |
| 3,458,491 | * 7/1969 | Dennis | 536/85 |
| 3,755,269 | 8/1973 | Uraneck et al. | 260/79.5 |

OTHER PUBLICATIONS

"Synthesis of Eng–Functionalized Polymer by Means of Living Anionic Polymerization, 5. Syntheses of Polystyrenes and Polyisoprenes with Hydroxy and Mercapto End Groups by Reactions of the Living Polymers with Haloalkanes Containing Silyl Ether and Silyl Thioether Functions" by Mieko Tohyama et al. *Macromolecular Chemistry and Physics,* vol. 197, No. 10, pp. 3135–3148, Oct. 1, 1996.

\* cited by examiner

Primary Examiner—Bernard Lipman
(74) Attorney, Agent, or Firm—D. G. Burleson; A. M. Reginelli

(57) ABSTRACT

A method of preparing a functionalized polymer comprising the steps of initiating the formation and propagation of an anionically-polymerized living polymer, and terminating the propagation of the living polymer by reacting the polymer with a terminating agent selected from the group of agents defined by the formulas (III), (IV), and (V)

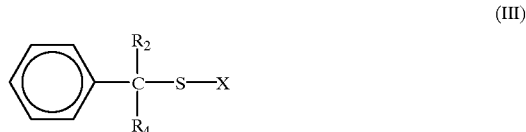

(III)

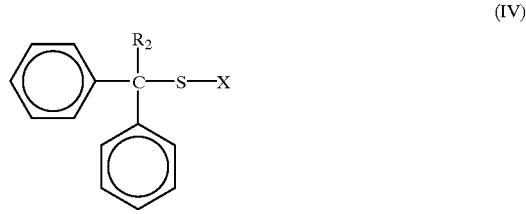

(IV)

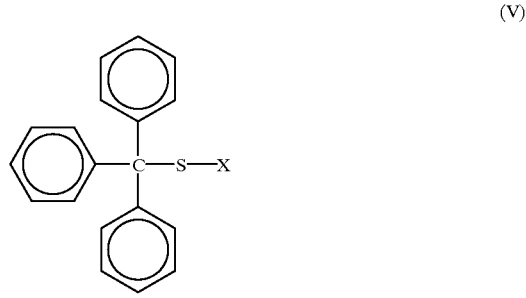

(V)

where C is a carbon atom, S is a sulfur atom, X is a halogen atom, $R_2$ and $R_4$ are independently selected from hydrogen and carbon-based moieties, and where the phenyl groups are selected from unsubstituted and substituted phenyl groups.

14 Claims, No Drawings

SULFENYL HALIDE POLYMERIZATION TERMINATORS

TECHNICAL FIELD

This invention relates to compounds that are useful for terminating an ionicpolymerization reactions. More particularly, the compounds of this invention are polymerization terminators that impart a functionality to the resulting polymer. Specifically, the compounds of this invention are sulfenyl halides. One preferred embodiment of this invention is directed toward the use of these sulfenyl halides to terminate elastomers that are useful in fabricating tires.

BACKGROUND OF THE INVENTION

The formation of polymers by anionic polymerization is well known in the art. These polymers are typically achieved by the formation of a living polymer that reacts with monomeric segments. Completion of this polymerization process is generally achieved by terminating this living polymer. In other words, the living end is reacted with a terminating agent that quenches the polymerization process. Many terminating agents, which also include coupling or linking agents, are known in the art.

When conducting polymerizations on a commercial basis, it is important to utilize process conditions and components that will allow the molecular weight of the end products to be narrowly and reproducibly defined. The characteristics of a given polymer and its usefulness are dependent, among other things, upon its molecular weight. Hence, it is desirable to be able to predict with some certainty the molecular weight of the end product of the polymerization. When the molecular weight is not narrowly definable, or is not reproducible on a systematic basis, the process is not commercially viable. Living anionic polymerization typically affords the ability to control not only molecular weight, but also to obtain a relatively narrow molecular weight distribution.

In the art, it is desirable to produce vulcanizates exhibiting reduced hysteresis loss characteristics. When these vulcanizates are fabricated into articles such as tires, power belts, and the like, they show an increase in rebound, a decrease in rolling resistance, and will have less heat build-up when mechanical stresses are applied.

It is believed that a major source of hysteretic power loss is caused by the section of the polymer chain from the last cross link of the vulcanizate to the end of the polymer chain. This free end cannot be involved in an efficient, classically recoverable process; and as a result, any energy transmitted to this section of the cured vulcanizate is lost as heat. It is known in the art that this type of mechanism can be reduced by preparing higher molecular weight polymers that will have fewer end groups. However, this procedure is not useful because rubber processability when combined with compounding ingredients decreases rapidly during mixing and shaping operations.

It is also known in the art to reduce hysteresis loss by providing the end of the polymeric chain with a functional unit that will serve to anchor the free end and reduce hysteresis loss. For example, U.S. Pat. No. 5,552,473 to Lawson et al. teaches polymers initiated with one functional group and terminated with a second functional group. As a result, an elastomer is produced having greater affinity for compounding materials, such as carbon black, thereby reducing hysteresis loss. Others have provided the end of elastomers that are useful in making tires with a number of end-functionalities. For example, U.S. Pat. No. 5,015,692 teaches polymer functionalization through terminating reactions with nitro compounds, phosphoryl chloride compounds, and amino silane compounds. In a similar fashion, U.S. Pat. No. 5,128,416 teaches end-functionalization through terminating reactions with phosphoryl chloride, amino silane, acrylamides, or aminovinyl silane compounds in combination with conventional silicon or tin coupling compounds. Still further, U.S. Pat. No. 4,730,025 teaches a process whereby moving polymers are reacted with certain terminating agents resulting in the formation of a reactive end-group that can subsequently be reacted with the backbone of other polymer chains. The functionalizing agents include tetraalkylthiurane disulfides, xanthates, and certain compounds containing tetrachlorocyclopentadiene radicals.

Because the reduction in hysteresis of rubber vulcanizates remains a goal of the tire industry, there is a need for new and useful functionalized polymers capable of exhibiting these properties. Also, functionalized polymers can be used in a variety of other applications. For example, certain reactive functional groups can serve as a location within a polymer where grafting and coupling reactions can take place.

SUMMARY OF INVENTION

It is therefore, an object of the present invention to provide a compound that can be employed as a terminator for anionic polymerization reactions.

It is another object of the present invention to provide a terminator compound that can impart a functionality to the polymer it terminates.

It is yet another object of the present invention to provide a terminally-functionalized polymer that can be added to a recipe for fabricating tire components.

It is still another object to provide vulcanizates that are derived from terminally-functionalized elastomers, where the functionalization reduces the hysteresis loss of the vulcanizate.

It is another object to provide polymers with protected sulfur-functionalities at their terminal positions.

It is yet another object to provide polymers with protected sulfur-functionalities that are capable of interacting with other components within rubber vulcanizates such as reinforcing fillers and other polymer chains.

At least one or more of the foregoing objects, together with the advantages thereof over the known art relating to functionalized polymers and vulcanizates thereof, which shall become apparent from the specification that follows, are accomplished by the invention as hereinafter described and claimed.

In general the present invention provides a method of preparing a functionalized polymer comprising the steps of initiating the formation and propagation of an anionically-polymerized living polymer, and terminating the propagation of the living polymer by reacting the polymer with a terminating agent selected from the group of agents defined by the formulas (III), (IV), and (V)

(III)

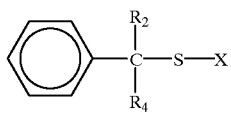

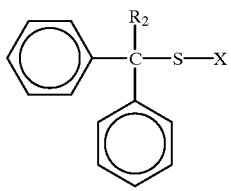
(IV)

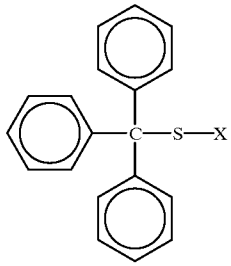
(V)

where C is a carbon atom, S is a sulfur atom, X is a halogen atom, $R_2$ and $R_4$ are independently selected from hydrogen and carbon-based moieties, and where the phenyl groups are selected from unsubstituted and substituted phenyl groups.

The present invention also includes a method of terminating an anionically-polymerized polymer comprising the step of reacting a living, anionically-polymerized polymer with a terminating agent that is defined by the formula (I)

$$R_1-S-X \tag{I}$$

where S is a sulfur atom, X is a halogen atom, and $R_1$ is a carbon-based moiety, with the proviso that the carbon-based moiety does not include a Zerewittenoff-reactive substituent.

The present invention further provides a vulcanizate prepared by a process comprising the steps of vulcanizing a vulcanizable composition of matter that includes at lease one polymer that has been prepared by reacting a living, anionically-polymerized polymer with a terminating agent that is defined by the formula (I)

$$R_1-S-X \tag{I}$$

where S is a sulfur atom, X is a halogen atom, and $R_1$ is a carbon-based moiety, with the proviso that the carbon-based moiety does not include a Zerewittenoff-reactive substituent.

The present invention also includes a method for grafting a polymeric chain to another polymer comprising the steps of reacting at least one functionalized polymer with a second polymer that contains a reactive site where the functionalized polymer is prepared by reacting a living, anionically-polymerized polymer with a terminating agent that is defined by the formula (I)

$$R_1-S-X \tag{I}$$

where S is a sulfur atom, X is a halogen atom, and $R_1$ is a carbon-based moiety, with the proviso that the carbon-based moiety does not include a Zerewittenoff-reactive substituent.

PREFERRED EMBODIMENT FOR CARRYING OUT THE INVENTION

It has now been found that anionically-polymerized living polymers can be terminated with certain sulfenyl halide compounds. Advantageously, this termination provides the polymer with a functionality at its terminal end that has an affinity for other compounds typically used in polymeric compositions such as reinforcing fillers. Therefore, vulcanizates derived from these polymers exhibit improved properties including reduced hysteresis loss. Accordingly, the present invention is directed toward sulfenyl halide compounds and their use as terminators in anionic polymerization reactions. Also, the preferred embodiments of this invention include polymers that contain a terminal functionality that results from termination with a compound of this invention, vulcanizable compositions of matter including these terminated polymers, and the resulting vulcanizates that demonstrate reduced hysteresis loss properties.

The sulfenyl halide compounds of this invention are generally defined according to formula I $$R_1-S-X \tag{I}$$

where S is a sulfur atom, X is a halogen atom, and $R_1$ is a carbon-based moiety. Preferred halogen atoms include chlorine, bromine, and fluorine, with chlorine being the most preferred halogen. The carbon-based moiety can include any monovalent structure known in the field of organic chemistry so long as the structure is neutral toward a living polymer chain end. In other words, the structure will not interact strongly with or react with a living polymer. For purposes of this specification, these substituents will be referred to as neutral substituents. One type of substituent that will react with a living polymer chain end is a Zerewittenoff-reactive substituent. As those skilled in the art will appreciate, a Zerewittenoff-reactive substituent, such as an active hydrogen, is a substituent that will react with methyl magnesium bromide. As a general rule, hydrogen atoms that are connected to oxygen, nitrogen, sulfur, or phosphorus are Zerewittenoff-reactive substituents; although this group is not exhaustive because some highly acidic carbon-hydrogen groups are Zerewittenoff-reactive substituents. For a further understanding of Zerewittenoff-reactive substituents, one can refer to ADVANCED ORGANIC CHEMISTRY REACTIONS, MECHANISMS, AND STRUCTURE, $3^{RD}$ EDITION, by Jerry March, John Wiley & Sons, Inc. (1 985). Other substituents that should be avoided include carbonyls, such as esters, ketones, or aldehydes that can react with the living chain end.

Carbon-based organic moieties that are useful for practicing this invention include both aliphatic and aromatic groups. The aliphatic groups can be saturated, i.e., alkyl groups, or saturated alkenyl or alkynyl groups. Further, the aliphatic groups can be straight chain, branched or cyclic groups. The aromatic groups can be substituted, which means that a hydrogen atom on the phenyl ring is substituted with a carbon based organic moiety. The carbon-based organic moieties may include hetero atoms. In other words, a carbon atom within an organic moiety can be substituted or interchanged with another atom such as oxygen, sulfur, silicon, phosphorous, or nitrogen atoms.

Some organic groups include, without limitation, the following alkyl groups: methyl, ethyl, propyl, isopropyl, butyl, isobutyl, pentyl, cyclopentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 1-methylbutyl, 2-methylpentyl, 2-methylhexyl, 2-methylheptyl, 2-methyloctyl, 2,3- dimethylbutyl, 2,3,3-trimethylbutyl, 3-methylpentyl, 2,3-dimethylpentyl, 2,4-dimethylpentyl, 2-3-3-4-tetramethylpentyl, 3-methylhexyl, 2,5-dimethylhexyl and the like.

Oxygen containing organic groups include, without limitation, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxhheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxbutyl, hexyloxypentyl, heptyloxyhexyl, heptyloxyheptyl, heptyloxyoctyl, heptyloxynonyl, heptyloxydecyl, octloxymethyl, oxtyloxyethyl, oxtyloxypropyl, oxtyloxybutyl, octyloxpentyl, oxtyloxyhexyl, octyloxyheptyl, octyloxynonyl, octyloxyoctyl, decyloxymethyl, docyloxyethyl, decyloxpropyl, decyloxybutyl, decyloxypentyl, decyloxyhexyl, and decyloxyheptyl.

Similar sulphur, silicon, phosphorous, or nitrogen containing organic groups are contemplated and should be known by those skilled in the art.

In one specific embodiment of this invention, the sulfenyl halide compounds are defined according to formula II $$R_3-\underset{R_4}{\overset{R_2}{\underset{|}{C}}}-S-X \quad (II)$$

where S is a sulfur atom, C is a carbon atom, X is a halogen atom, and $R_2$, $R_3$, and $R_4$ are independently selected from hydrogen and carbon-based moieties, with the proviso that at least one of $R_2$, $R_3$, and $R_4$ include a carbon-based moiety. Preferred halogens include chlorine and bromine, with chlorine being the most preferred. Preferred carbon-based moieties include alkyl and alkenyl groups having from 1 to about 18 carbon atoms, and phenyl or substituted phenyl groups, where the substituted phenyl groups are organic moieties having from 1 to about 18 carbon atoms.

Exemplary compounds include:

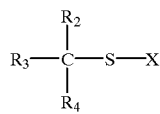

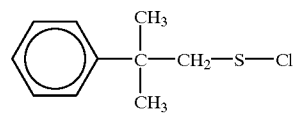

-continued

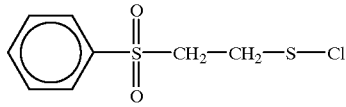

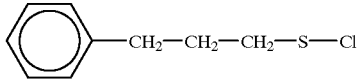

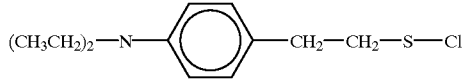

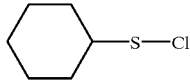

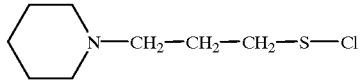

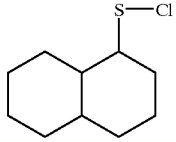

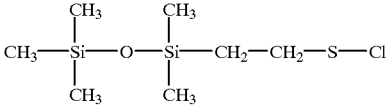

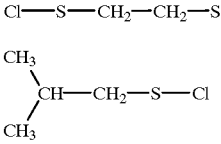

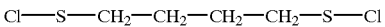

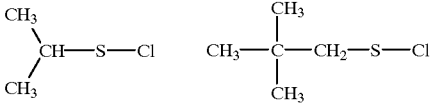

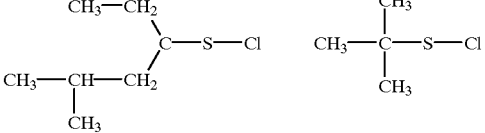

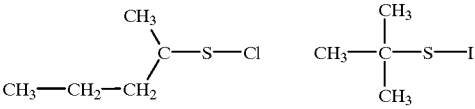

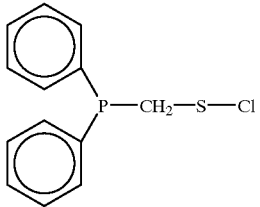

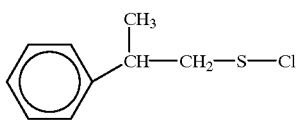

In a preferred embodiment of this invention, the sulfenyl halide compounds will include at least one phenyl substituent and are therefore defined according to formulas III, IV, and V

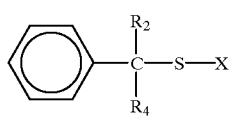

(III)

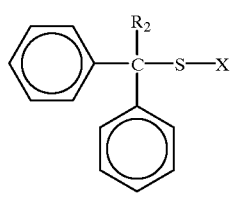

(IV)

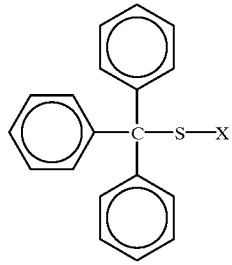

(V)

where the substituents C, S, X, $R_2$ and $R_4$ are defined as above and where the phenyl groups can be substituted. Proferred halogen atoms include chlorine and bromine, with chlorine being the most preferred. Non-limiting examples of specific compounds represented by the formulas III, IV, and V include:

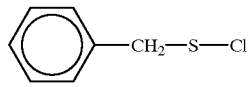

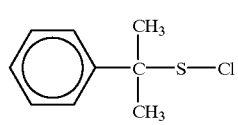

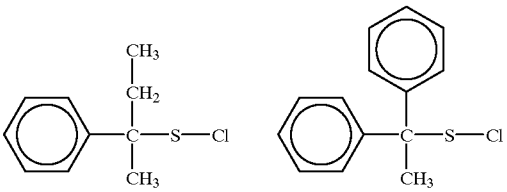

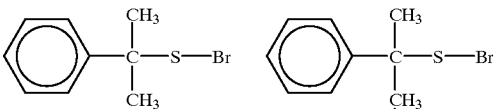

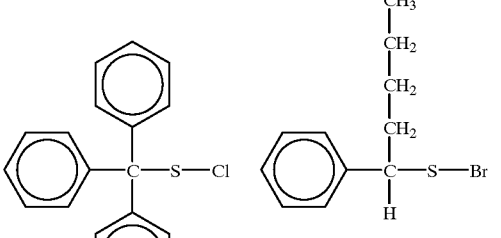

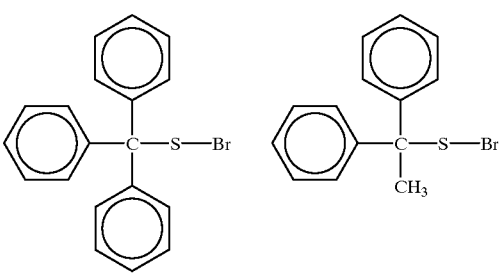

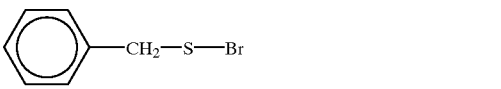

The substituted phenyl groups can more specifically be defined as monovalent phenyl groups according to formula VI

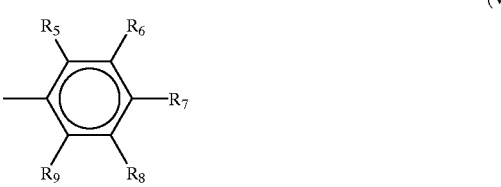

(VI)

where the monovalent bond is attached to the carbon atom shown in formulas III, IV, and V, and $R_5$, $R_6$ $R_7$, $R_8$, and $R_9$ are independently selected from hydrogen, halogen atoms, or carbon-based moieties as generally disclosed above. It should be understood that the open valent bond is covalently bonded to the carbon atom in formulas III, IV, and V. Again, these moieties should not include a substituent that can readily react with a living polymer chain such as a Zerewittenoff-reactive substituent. Preferably, the carbon-based moieties contain from 1 to about 18 carbon atoms, and even more preferably from 1 to about 10 carbon atoms. Furthermore, preferred carbon-based moieties include alkyl moieties that are linear, branched, or cyclic groups. These moieties may likewise include hetero atoms, as defined above. Preferred moieties for $R_5$, $R_6$, $R_7$, $R_8$ and $R_9$ include alkyls having less than 6 carbon atoms, ethers such as methoxy and ethoxy groups, amino groups, and dialkyl amino groups. Preferred halogen atoms include chlorine, bromine and fluorine.

Specific examples of compounds that contain substituted aryl moieties include:

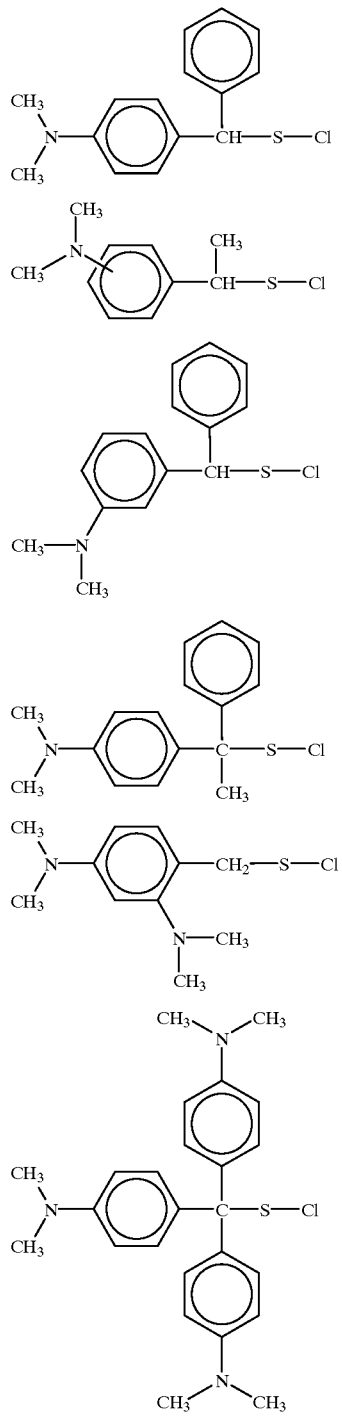

-continued

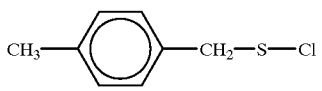

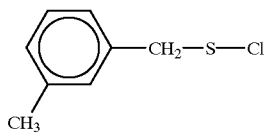

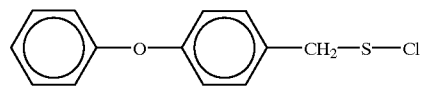

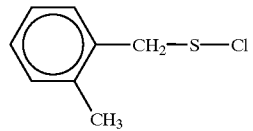

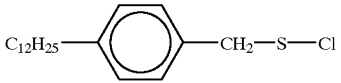

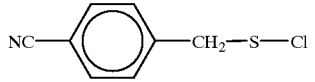

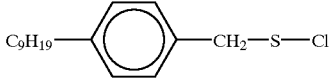

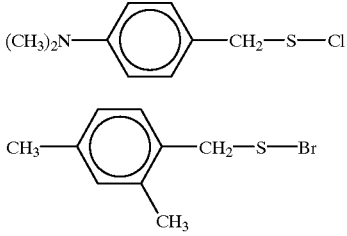

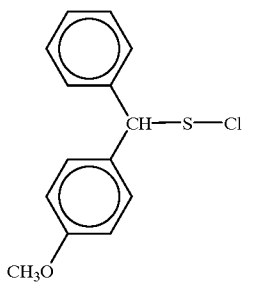

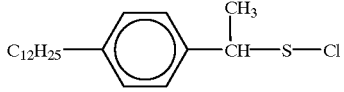

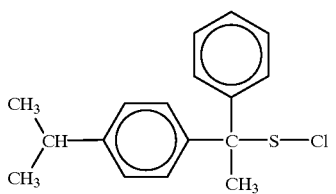

-continued

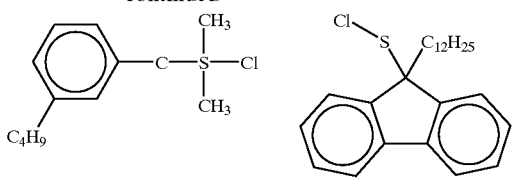
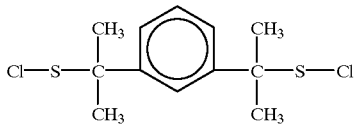
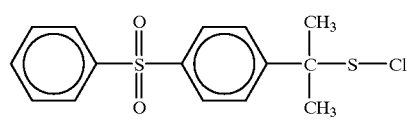
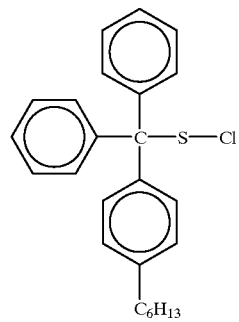
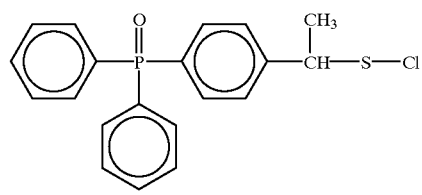
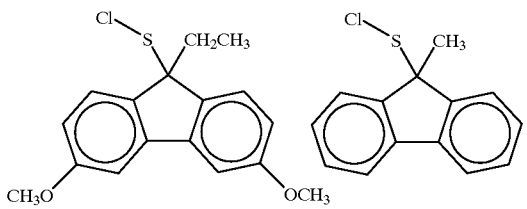
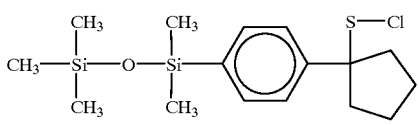
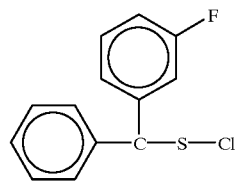

-continued

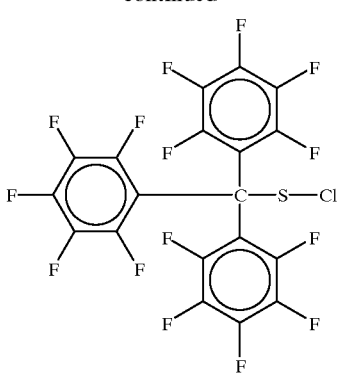
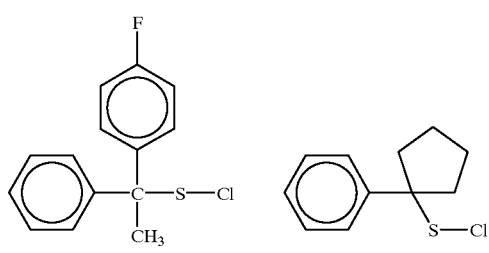
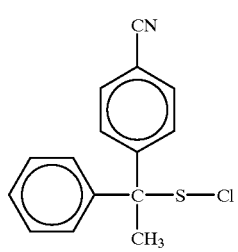
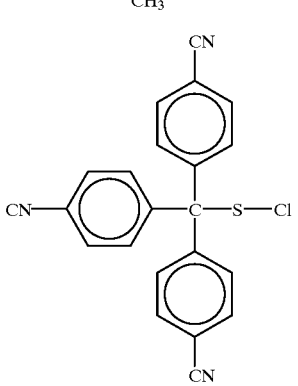

The sulfenyl chloride compounds of this invention can be synthesized by a number of reactions or techniques, employing a variety of conditions, and by using various solvents. Indeed, organosulfenyl halides have been known since the 1870's, and many synthetic approaches to them are available. For example, organo sulfenyl chlorides and bromides can be formed by the halogenation of disulfides:

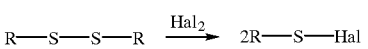

where R can be a variety of organic groups, and Hal is the same as X defined above, such as chlorine or bromine, or a halogen containing compound such as $SO_2Cl_2$, etc. Sulfenyl halides can also be formed by the halogenation of thiols:

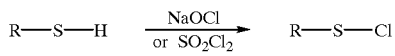

where R can be a variety of organic groups. This reaction has particular utility in the preparation of triphenyl methane sulfenyl chloride. Organo sulfenyl chlorides can be formed by halogenolys is of monosulfides, especially benzylic monosulfides. In one such case, benzyl sulfenyl chloride can be formed by halogenolysis of triphenyl methyl benzyl sulfide by using iodobenzene dichloride as the halogenating compound:

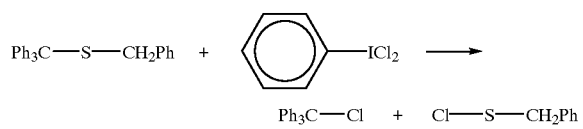

Another method of preparing sulfenyl halides is through substitution reactions such as:

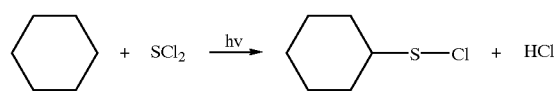

Addition reactions with olefinic substrates can also be used, although this results in a halo alkyl sulfenyl halide that is less preferred. Sulfenyl halides of fluorine and iodine are also known, but are prepared by less direct routes, such as substitution of fluoride for chloride, or substitution of iodide for a metal tom. Most, if not all, of the known sulfenyl fluorides have a perfluoro organic group. For further information regarding the techniques that can be used to prepare the compounds of this invention, one can refer to the three articles published by Kühle in SYNTHESIS, INTERNATIONAL JOURNAL OF METHODS IN SYNTHETIC ORGANIC CHEMISTRY: *One Hundred Years Sulfonic Acid Chemistry I. Sulfenyl Halide Syntheses* (1970 pp 561–580), IIa. *Oxidation, Reduction, and Addition Reaction of Sulfenyl Halides* (1971 pp 563–586), and IIIb. *Substitution and Cyclization Reactions of Sulfenyl Halides* (1971 pp 617–638).

Some of the sulfenyl chlorides that are useful in practicing this invention are commercially available. For example, triphenylmethane sulfenyl chloride is available from the Aldrich Chemical Company of Milwaukee, Wis.

As noted above, the compounds of this invention are useful for terminating anionic polymerization reactions. Anionic polymerization reactions generally include the reaction of monomers by nucleophilic initiation to form and propagate a polymeric structure. Throughout the formation and propagation of the polymer, the polymeric structure is ionic or "living." A living polymer, therefore, is a polymeric segment having a living or reactive end. For example, when a lithium containing initiator is employed to initiate the formation of a polymer, the reaction will produce a reactive polymer having a lithium atom at its living or reactive end. For further information respecting anionic polymerizations, one can refer to PRINCIPLES OF POLYMERIZATION, $3^{RD}$ EDITION, by George Odian, john Wiley & Sons, Inc. (1 991), Chapter 5, entitled *Ionic Chain Polymerization*. This chapter is incorporated herein by reference.

The monomers that can be employed in preparing a living polymer that can be terminated according to this invention include any monomer capable of being polymerized according to anionic polymerization techniques. Again, reference can be made to Chapter 5 of PRINCIPLES OF POLYMERIZATION in this regard. These monomers include those that lead to the formation of elastomeric homopolymers or copolymers, as well as those that lead to the formation of thermoplastic homopolymers and copolymers, and combinations of the two monomers. Suitable monomers include, without limitation, conjugated dienes having from about 4 to about 12 carbon atoms, monovinyl aromatic monomers having 8 to 18 carbon atoms, trienes, and acrylates having from about 4 to about 23 carbon atoms. Examples of conjugated diene monomers include, without limitation, 1,3-butadiene, isoprene, 1,3-pentadiene, 2,3-dimethyl-1,3-butadiene, and 1,3-hexadiene. Aromatic vinyl monomers include, without limitation, styrene, alpha-methyl styrene, p-methylstyrene, vinyltoluene, and vinylnaphthalene. Examples of acrylate monomers include methacrylate, ethyl acrylate, butylacrylate, dodecyl acrylate, methyl methacrylate, butyl methacrylate, nonyl methacrylate, and octadecyl methacrylate. When preparing elastomeric copolymers, such as those containing conjugated dienes monomer and aromatic vinyl monomers, the conjugated diene monomers and aromatic vinyl monomers are normally used at a ratio of 95-50:5-50, and preferably 95-65:5-35, respectively.

Likewise, any nucleophilic initiator can be employed to initiate the formation and propagation of the living polymers that can be terminated according to this invention. Exemplary initiators include, but are not limited to, alkyl lithium initiators, arenyllithium initiators, arenylsodium initiators, N-lithium dihydro-carbon amides, aminoalkyllithiums, alkyl tin lithiums, dialkyl magnesiums, alkyl magnesium halides, diaryl magnesiums, and aryl magnesium halides. More specifically, useful initiators include N-lithiohexamethyleneimide, N-lithiopyrrolidinide, and N-lithiododecamethyleneimide. Other initiators include organolithium compounds such as substituted aldimines, substituted ketimines, and substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, and 5,786,441. Reference can also be made to Chapter 5 of PRINCIPLES OF POLYMERIZATION for sundry nucleophilic initiators.

Typically, polymerization is conducted in a polar or non-polar solvent such as tetrahydrofuran (THF), a hydrocarbon solvent such as the various cyclic and acyclic hexanes, heptanes, octanes, pentanes, their alkylated derivatives, and mixtures thereof. In order to promote randomization in copolymerization and to control vinyl content, a polar coordinator may be added to the polymerization ingredients. Amounts range between 0 and about 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units. The molecular weight of the polymer ("base polymer") that is produced in this invention is optimally such that a proton-quenched sample will exhibit a gum Mooney (ML/4/100) of from about 1 to about 150. However, useful lower molecular weight compounds can also be made using these initiators.

These might typically be considered fluids, having molecular weights ranging from several hundreds to tens of thousands of mass units. They can be used as viscosity modifiers, as dispersants for particulates such as carbon black in oil, and as reactive modifiers for other polymers.

Polymers of the present invention can be of any molecular weight depending on the intended application. Generally, for purposes of making tire products, the molecular weight of the elastomers should fall within the range from about 50,000 to about 1,000,000 preferably from 80,000 to about 500,000 and most preferably from about 100,000 to about 250,000. When used as a viscosity modifier, the molecular weight of the polymer should generally fall within the range from about 500 to about 50,000, preferably from about 1,500 to about 30,000 and most preferably from about 2,000 to about 15,000. The foregoing molecular weights represent the number-average molecular weight ($M_n$) as measured by GPC analysis.

Other compounds useful as polar coordinators are organic and include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, N-N'-dimethylpiperazine, diazabicyclooctane, di methyl ether, diethylether, tributylamine and the like. The linear and cyclic oligomeric oxolanyl alkane modifiers are described in U.S. Pat. No. 4,429,091 and the subject matter therein relating to these modifiers is incorporated herein by reference. Compounds useful as polar coordinators include those having an oxygen or nitrogen hetero-atom and a non-bonded pair of electrons. Other examples include dialkyl ethers of mono and oligo alkylene glycols; "crown" ethers; tertiary amines such as tetramethylethylene diamine (TMEDA); linear THF oligomers; and the like.

A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 200° C., and the polymerization is allowed to proceed for from about 0.1 to about 24 hours. This reaction produces a reactive polymer having a lithium atom at its reactive or living end.

According to one embodiment of the present invention, therefore, the sulfenyl halide compounds disclosed above are reacted with a living polymer. It is believed that this reaction proceeds as set forth in the following reaction mechanism:

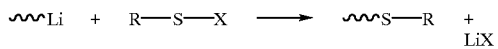

Thus, termination of a living polymer with the sulfenyl compound of the present invention results in a terminated polymer having a sulfur containing end-functionality where the sulfur atom is attached to the polymer chain as well as to a carbon atom on the terminal end of the functional group: this carbon atom may be referred to herein as the terminal carbon. This polymer can generally be represented by the formula VII:

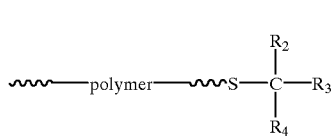

Ideally, where a living polymer is prepared with an initiator that provides the polymer with a functional group at its initiated end, termination of this polymer with a compound according to this invention will result in a multi-functionalized polymer such as that described by the formula VIII:

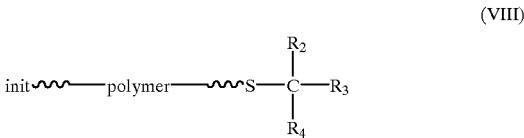

In general, polymers prepared according to this invention may be separated from any solvent in which the reaction may have taken place by conventional techniques. These techniques include steam or alcohol coagulation, thermal desolventizaition, or any other suitable method. Additionally, the solvent may be removed from the resulting polymer by drum drying, extruder drying, vacuum drying, or the like.

Ultimately, the sulfur containing end-functionality will dissociate whereby the bond between the sulfur atom and the terminal-carbon atom will break and form the following reactive intermediate:

ᴡᴡᴡ——polymer——ᴡᴡS*

Where the S* indicates an active sulfur atom. The active character associated with the sulfur atom is most likely the result of free radical, but it may in fact include some ionic character. Because it is not desired to be limited to any particular theory, the terminal sulfur will simply be referred to as an active sulfur. This active sulfur may interact with various fillers that can be present within elastomeric vulcanizates, as well as the other components in the vulcanizate including other elastomers. The active sulfur may also be able to react in various other reactions including coupling and grafting reactions. The dissociation of the sulfur containing end-functionality preferably occurs during processing or curing of the polymers. The nature and character of the substituent $R_1$ within the compound defined in formula I, above, or the nature and character of the substituents are sub $R_2$, $R_3$, or $R_4$ in the compounds defined by the formula 11 above will alter the bond energy between the sulfur atom and the terminal carbon. Accordingly, these substituents will impact the ability of the sulfur containing functional group to dissociate. Accordingly, the selection of certain substituents may allow those practicing this invention to control the point at which the sulfur containing functional group dissociates: e.g. during processing or at certain temperatures, such as curing temperature.

Sulfenyl halides can undergo addition to double bonds, as well as substitution by organometallics such as Gringnard reagents and organolithiums. Many of the living anionically - polymerized polymers contain both unsaturation and an organometallic site. Because of the high reactivity of organo lithiums and organo magnesiums with sulfenyl halides, the site of most reaction will be at the living polymer chain end, but some amount of chain additions may also occur. It is believed that the amount of addition that accompanies chain-end substitution will usually be small.

In one preferred embodiment of the present invention, elastomeric homopolymers or copolymers that have been terminated with the sulfenyl halide compounds of this invention are used within a vulcanizable composition of matter that is useful for fabricating tires. In this application or use, these elastomeric homopolymers and copolymers preferably include those prepared from conjugated diene monomers, alone or in combination with vinyl aromatic monomers. These include, without limitation, polybutadiene, styrene-butadiene copolymer, and isoprene. These elastomeric polymers can be used alone or in combination with other elastomers to prepare various tire component stock compounds. These stocks are useful for forming tire components such as treads, subtreads, black sidewalls, body ply skins, bead filler, and the like. The other elastomers that may be blended with the polymers prepared according to this invention include synthetic polyisoprene rubber, styrene-butadiene copolymer rubber (SBR), polybutadiene, butyl rubber, poly(chloroprene), ethylene-propylene copolymer rubber, ethylene-diene terpolymer rubber (EPDM), acrylonitrile-butadiene copolymer rubber (NBR), silicone rubber, fluoroelastomers, ethylene-acrylic copolymer rubber, ethylene vinyl acetate copolymer (EVA), epichlorohydrin rubbers, chlorinated polyethylene rubbers, chlorosulfonated polyethylene rubbers, hydrogenated nitrile rubbers, tetrafluoroethylene-propylene copolymer rubber and the like. When the polymers of the present invention are blended with conventional rubbers, the amount can vary widely such as between about 10 and about 99 percent by weight of the conventional rubber.

Typically, these vulcanizable compositions of matter include rubber component that is blended with reinforcing fillers and at least one vulcanizing agent. These compositions typically also include other compounding additives. These additives include, without limitation, accelerators, oils, waxes, scorch inhibiting agents, and processing aids. As known in the art, vulcanizable compositions of matter containing synthetic rubber stypically includeant idegradants, processing oils, zinc oxide, optional tackifying resins, optional reinforcing resins, optional fatty acids, optional peptizers, and optional scorch inhibiting agents. These vulcanizable compositions are compounded or blended by using mixing equipment and procedures conventually employed in the art. Preferably, an initial masterbatch is prepared that includes the rubber component and the reinforcing fillers, as well as other optional additives such as processing oil and antioxidants. Once this initial masterbatch is prepared, the vulcanizing agents are blended into the composition. This vulcanizable composition of matter can then be processed according to ordinary tire manufacturing techniques. Likewise, the tires are ultimately fabricated by using standard rubber curing techniques. For further explanation of rubber compounding and the additives conventionally employed, one can refer to *The Compounding and Vulcanization of Rubber*, by Stevens in RUBBER TECHNOLOGY SECOND EDITION (1973 Van Nostrand Reihold Company), which is incorporated herein by reference.

The reinforcing agents, such as carbon black or silica, typically are employed in amounts ranging from about 1 to about 100 parts by weight per 100 parts by weight rubber (phr), with about 20 to about 80 parts by weight (phr) being preferred, and with about 40 to about 80 parts by weight (phr) being most preferred. The carbon blacks may include any of the commonly available, commercially-produced carbon blacks, but those having a surface area (EMSA) of at least 20 m$^2$/g and more preferably at least 35 m$^2$/g up to 200 m$^2$/g or higher are preferred. Surface area values used in this application are those determined by ASTM test D-1 765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Typical values for surface areas of usable carbon blacks are summarized in the following table.

| CARBON BLACKS | |
|---|---|
| ASTM Designation (D-1765-82a) | Surface Area (m$^2$/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds used may be in pelletized form or in unpelletized flocculent mass. Preferably, for more uniform mixing, unpelletized carbon black is preferred.

With respect to the silica fillers, the vulcanizable compositions of the present invention may preferably be reinforced with amorphous silica (silicon dioxide). Silicas are generally referred to as wet-process, hydrated silicas because they are produced by a chemical reaction in water, from which they are precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 m$^2$/g, with the range of about 100 to about 250 m$^2$/g being preferred, and the range of about 150 to about 220 m$^2$/g being most preferred. The pH of the silica filler is generally about 5.5 to about 7 or slightly over, preferably about 5.5 to about 6.8.

When employed, silica can be used in the amount of about 1 part to about 100 parts by weight per 100 parts of polymer (phr), preferably in an amount from about 5 to about 80 phr. The useful upper range is limited by the high viscosity imparted by fillers of this type. Usually, both carbon black and silica are employed in combination as the reinforcing filler. When both are used, they can be used in a carbon black silica ratio of from about 10:1 to about 1:2. Some of the commercially available silicas that may be used include: Hi-Sil® 215, Hi-Sil® 233, and Hi-Sil® 190, produced by PPG Industries. Also, a number of useful commercial grades of different silicas are available from a number of sources including Rhone Poulenc. Typically, a coupling agent is added when silica is used as a reinforcing filler. One coupling agent that is conventionally used is bis-[3 (triethoxysilyl) propyl]-tetrasulfide, which is commercially available from Degussa, Inc. of New York, N.Y. under the tradename S169.

The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, ENCYCLOPEDIA OF CHEMICAL TECHNOLOGY, 3rd ed., Wiley Interscience, N.Y. 1982, Vol. 20, pp. 365–468, particularly *Vulcanization Agents and Auxiliary Materials* pp. 390–402., or *Vulcanization* by A. Y. Coran, ENCYCLOPEDIA OF POLYMER SCIENCE AND ENGINEERING, $2^{nd}$ Edition, John Wiley & Sons, Inc., 1989; both of which are incorporated herein by reference. Vulcanizing agents may be used alone or in combination. This invention does not affect cure times and thus the polymers can be cured for a conventional amount of time. Cured or crosslinked polymers will be referred to as vulcanizates for purposes of this disclosure.

In another embodiment, anionically-polymerized polymers terminated with sulfenyl halides according to this invention can be reacted with other polymers or copolymers that include at least one reactive site. These reactive sites can include a double bond, or a triple bond. These reactions are useful for a number of reasons including, without limitation, compatiblization of polymers and copolymers, alteration or modification of the mechanical properties of polymers and copolymers, such as hardness, or the active sulfur can be used to reinitiate further polymerization.

It is especially preferred that reaction between the polymers terminated according to this invention and the other polymers containing at least one reactive site take place by way of reactive extrusion. For further information respecting reactive extrusion reactions, one can refer to REACTIVE EXTRUSION PRINCIPALS AND PRACTICE, by Xanthos (1992 Hanser Publishers).

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

A styrene-butadiene copolymer was prepared by anionic polymerization and terminated with a triphenyl methyl sulfenyl chloride. Physical properties of the polymer, including viscosity, hysteresis loss, and tensile properties were examined and compared to those properties of similarly prepared polymers that were not terminated with triphenyl methyl sulfenyl chloride.

In preparing the styrene-butadiene copolymer, 687.1 grams of styrene monomer and 2125.9 grams of 1,3-butadiene monomer were reacted in 21.8 lbs. of hexane and 4.6 mmol of oligomeric ethers. n-Butyllithium was used to initiate the polymerization.

Under positive nitrogen pressure, the reaction was stirred at about 80° F. for about 4.5 hours and then the temperature was elevated to about 120° F. for about two hours. The reaction mixture was then allowed to cool to about 86° F., and stirring was continued overnight. A sample of this reactive polymer, i.e., living polymer, was quenched with isopropyl alcohol. By using GPC analysis, it was found that this quenched sample had a number average molecular weight ($M_n$) of 134,400, a weight average molecular weight ($M_w$) of 169,300, and a molecular weight distribution of 1.26. The polymer had a glass transition temperature ($T_g$) of −29.6° C., and a Mooney Viscosity of 26.8 (ML 1+4(100° C.)). NMR analysis showed that the polymer contained 24.8 percent by weight bound styrene, and 46.4 percent by weight bound vinyl content. No block styrene was observed.

A sample of about 522 grams of the living polymer was then reacted with 28.6 ml of a 0.042 M solution of triphenyl methyl sulfenyl chloride in anhydrous toluene. The reactants were combined under a positive nitrogen purge and agitated at 50° C. for about 16 hours, and then ultimately quenched with 1 ml of isopropyl alcohol. The polymers were then also treated with 2 ml of a one percent solution of di t-butyl paracresol, which is an antioxidant. The resulting terminally-functionalized polymers were coagulated in isopropyl alcohol, air-dried at room temperature, and subsequently vacuum dried at 60° C. to a constant weight. Analysis of the terminated polymers showed a Mooney Viscosity of about 25 (ML 1+4(100° C.), with the same microstructure and approximately the same glass transition temperature as the base polymer. Also, the polymer had a number average molecular weight ($M_n$) of 149,700, a weight average molecular weight ($M_w$) of 200,800, and a molecular weight distribution of 1.34.

The terminally functionalized and non-functionalized polymer prepared above were separately compounded within a tire recipe. The tire recipe employed is set forth in Table I:

TABLE I

TIRE RECIPE

| Ingredient | Parts per Hundred Parts Rubber | |
| --- | --- | --- |
| Rubber | 100 | |
| Paraffinic Oil | 10 | |
| Carbon Black (N-351) | 55 | |
| Zinc Oxide | 3 | |
| Antioxidant | 1 | |
| Wax | 2 | |
| Masterbatch | | 171 |
| Stearic Acid | 2 | |
| Sulfur | 1.5 | |
| Accelerator | 1 | |
| | | 175.5 |

Standard compounding techniques were used to blend the polymer, paraffinic oil, carbon black, zinc oxide, antioxidant, and wax blend into a masterbatch within an internal mixer at about 140–145° C. at 60 rpm. This masterbatch was then allowed to cool, and the stearic acid, sulfur, and accelerator were added, and the mixing was continued at about 77–93° C. and 40 rpm for about 3 minutes. The resulting vulcanizable composition of matter was calendered and fabricated into tensile plaques that were 3"×6" by 0.040" thick. These plaques were then cured at 300° F. for 35 minutes. These plaques were then cured at 300° F. for 35 minutes, and the Dynastat buttons were cured for 40 minutes at 300° F. The cured plaques were then subjected to physical testing to determine ring tensile properties and hysteresis loss. The ring tensile properties and the hysteresis loss properties were examined pursuant to ASTM procedures. Table II sets forth the results of this testing.

TABLE II

| Property | Non-Functionalized Rubber | Functionally Terminated Rubber |
|---|---|---|
| Tan δ @ 1Hz | | |
| 50° C. | 0.1949 | 0.1156 |
| 24° C. | 0.2450 | 0.1510 |
| Ring Tensile | | |
| 300% Modulus (psi) | 2026 | 2225 |
| Tensile Strength at Break (psi) | 2874 | 2977 |
| Elongation at Break (%) | 402 | 344 |

The foregoing data shows that the rubber terminated with the triphenyl methyl sulfenyl chloride has a 41 percent reduction in hysteresis loss at 50° C.

Based upon the foregoing disclosure, it should now be apparent that the use of the terminator compounds described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the sulfenyl halide compounds according to the present invention are not necessarily limited to those having a phenyl substituent. Also, the invention should not be limited to the termination of rubbery elastomers. Thus, the scope of the invention shall include all modifications and variations that may fall within the scope of the attached claims.

What is claimed is:

1. A method of preparing a functionalized polymer comprising the steps of:

initiating the formation and propagation of an anionically-polymerized living polymer, and terminating the propagation of the living polymer by reacting the polymer with a terminating agent selected from the group of agents defined by the formulas (III), (IV), and (V)

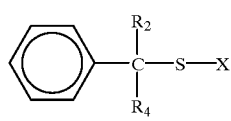

(III)

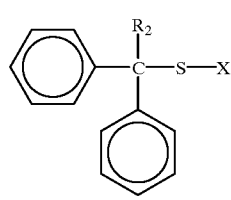

(IV)

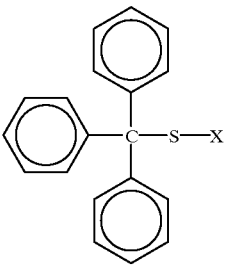

(V)

where C is a carbon atom, S is a sulfur atom, X is a halogen atom, $R_2$ and $R_4$ are independently selected from hydrogen and carbon-based moieties, and where the phenyl groups are selected from unsubstituted and substituted phenyl groups.

2. A method of preparing a functionalized polymer, as set forth in claim 1, where said carbon-based moieties are neutral substituents.

3. A method of preparing a functionalized polymer, as set forth in claim 1, where said carbon-based moieties include from 1 to about 18 carbon atoms.

4. A method of preparing a functionalized polymer, as set forth in claim 1, where said carbon-based moieties are selected from aryl groups, substituted aryl groups, amino groups, substituted amino groups, and alkyl groups.

5. A method of preparing a functionalized polymer, as set forth in claim 1, where said substituted phenol groups are defined by the formula

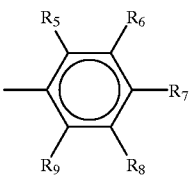

(VI)

where $R_5$, $R_6$, $R_7$, $R_8$, and $R_9$ are selected from the group including hydrogen atoms, halogen atoms, and carbon-based moieties.

6. A method of preparing a functionalized polymer, as set forth in claim 5, where said carbon-based moieties include from about 1 to about 18 carbon atoms.

7. A method of preparing a functionalized polymer, as set forth in claim 1, where said terminating agents are selected from

-continued

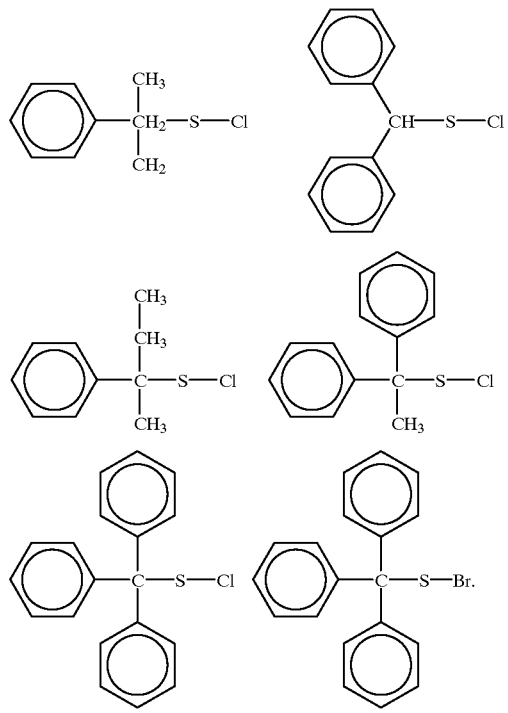

8. A method of preparing a functionalized polymer, as set forth in claim 1, where said terminating agents are selected from

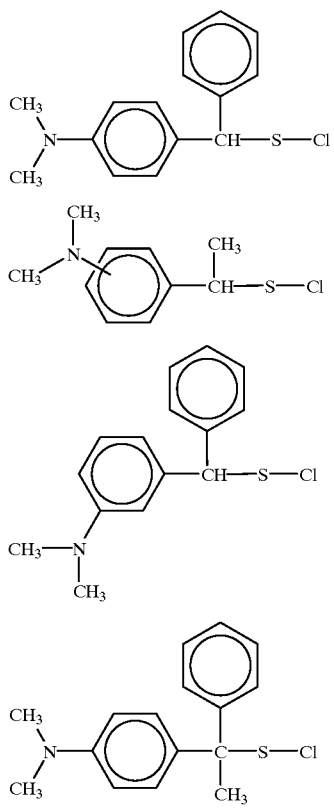

-continued

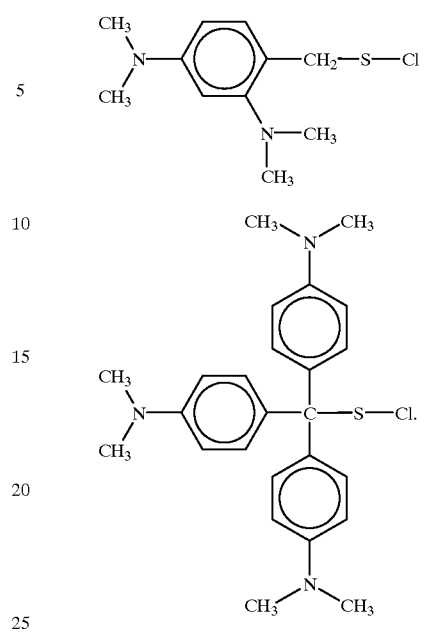

9. A method of preparing a functionalized polymer, as set forth in claim 1, where said terminating agents are selected from

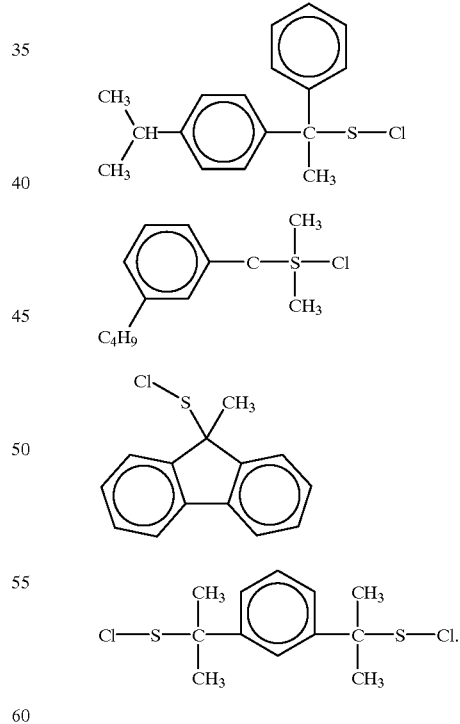

10. A method of preparing a functionalized polymer, as set forth in claim 1, where said terminating agents are selected from

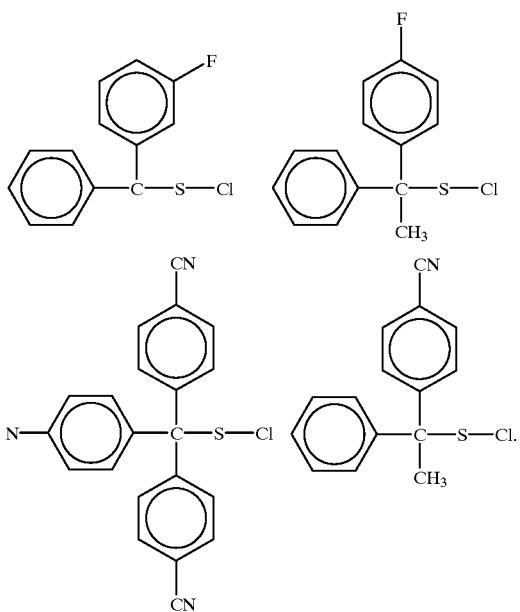

11. A method of preparing a functionalized polymer, as set forth in claim 1, wherein said terminating agent is triphenylrffethane sulfenyl chloride.

12. A method of rerminating an anionically-polymerized polymer comprising the step of:

reacting a living, anionically-polymerized polymer with a terminating agent that is defined by the formula (II)

(II)

where S is a sulfur arom, C is a carbon atom, X is a halogen atom, and R2, R3, and R4 are independently selected from hydrogen atoms and aliphatic or aromatic hydrocarbon moieties.

13. A method of preparing a functionalized polymer, as set forth in claim 12, where said aliphatic or aromatic hydrocarbon moieties are neutral substituents.

14. A method of preparing a functionalized polymer, as set forth in claim 12, where said carbon-based moieties include from 1 to about 24 carbon atoms.

* * * * *

UNITED STATES PATENT AND TRADEMARK OFFICE
CERTIFICATE OF CORRECTION

PATENT NO.   : 6,274,680 B1
DATED        : August 14, 2001
INVENTOR(S)  : Lawson et al.

It is certified that error appears in the above-identified patent and that said Letters Patent is hereby corrected as shown below:

Column 22,
Line 65, the formula                          should read

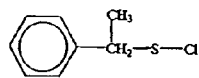       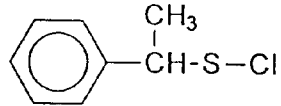

Column 23,
Line 5, the formula                          should read

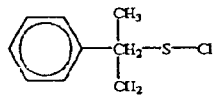       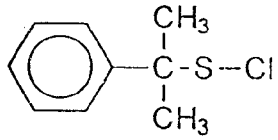

Column 23,
Line 15, the formula                          should read

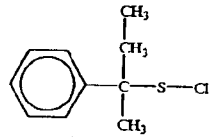       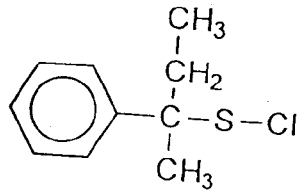

UNITED STATES PATENT AND TRADEMARK OFFICE
CERTIFICATE OF CORRECTION

PATENT NO. : 6,274,680 B1
DATED : August 14, 2001
INVENTOR(S) : Lawson et al.

It is certified that error appears in the above-identified patent and that said Letters Patent is hereby corrected as shown below:

Column 25,
Lines 27-28, "triphenylrffethane" should read -- triphenylmethane --

Column 26,
Line 1, "rerminating" should read -- terminating --
Line 16, "arom" should read -- atom --

Signed and Sealed this

Twenty-ninth Day of October, 2002

Attest:

Attesting Officer

JAMES E. ROGAN
*Director of the United States Patent and Trademark Office*